(12) United States Patent
Chimdyalwar et al.

(10) Patent No.: US 12,050,906 B2
(45) Date of Patent: Jul. 30, 2024

(54) METHOD AND SYSTEM FOR IDENTIFYING RELEVANT CHANGES FOR INCREMENTAL VERIFICATION OF EVOLVING SOFTWARE

(71) Applicant: Tata Consultancy Services Limited, Mumbai (IN)

(72) Inventors: Bharti Chimdyalwar, Pune (IN); Anushri Jana, Pune (IN); Shrawan Kumar, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 112 days.

(21) Appl. No.: 18/060,591

(22) Filed: Dec. 1, 2022

(65) Prior Publication Data
US 2023/0281007 A1    Sep. 7, 2023

(30) Foreign Application Priority Data
Mar. 7, 2022  (IN) .............................. 202221012260

(51) Int. Cl.
G06F 8/71    (2018.01)
G06F 8/75    (2018.01)

(52) U.S. Cl.
CPC . *G06F 8/71* (2013.01); *G06F 8/75* (2013.01)

(58) Field of Classification Search
CPC ..................................... G06F 8/71; G06F 8/75
(Continued)

(56) References Cited

U.S. PATENT DOCUMENTS 8,516,443 B2    8/2013    Li et al.
8,613,080 B2 *  12/2013    Wysopal .............. G06F 21/577
                                                    726/19
(Continued)

OTHER PUBLICATIONS

Fabbri, Sandra Camargo Pinto Ferraz, et al. "Mutation testing applied to validate specifications based on statecharts." Proceedings 10th International Symposium on Software Reliability Engineering (Cat. No. PR00443). IEEE, 1999.pp. 1-10 (Year: 1999).*

(Continued)

*Primary Examiner* — Satish Rampuria
(74) *Attorney, Agent, or Firm* — FINNEGAN, HENDERSON, FARABOW, GARRETT & DUNNER LLP

(57) ABSTRACT

Modern software verification tools are moving towards incremental verification of program properties to ensure safety of evolving software systems. However, not every change in the program impacts verification outcome of program properties. Moreover, analyzing these irrelevant changes adds to cost of incremental verification. A system and method have been provided for identifying relevant changes for incremental verification of evolving software. The disclosure provides a light-weight pre-analysis phase of identifying relevant changes that can lead to improvement in efficiency of all existing incremental verification techniques. To identify relevant changes, the system provides a relevant change identification technique (RCIT) with respect to program properties. The RCIT uses a variant of the strongly live variables (SLV) analysis to compute variables that are influencing the verification outcome of program properties. These variables are referred as value influencing variables (VIVs). The RCIT, then uses computed VIVs and changed statement information to identify relevant changes.

9 Claims, 5 Drawing Sheets

(58) Field of Classification Search
USPC .................................................. 717/120–178
See application file for complete search history.

(56) References Cited

U.S. PATENT DOCUMENTS

| | | | |
|---|---|---|---|
| 9,767,271 B2* | 9/2017 | Ghose ..................... | G06F 21/72 |
| 10,725,897 B2* | 7/2020 | Staples ............... | G06F 11/3688 |
| 11,681,811 B1* | 6/2023 | Dixit ........................ | H04L 9/50 |
| | | | 726/25 |
| 2021/0096941 A1* | 4/2021 | Stolfo ................ | G06F 11/0772 |

OTHER PUBLICATIONS

Wang, Tao, et al. "FD4C: Automatic fault diagnosis framework for Web applications in cloud computing." IEEE Transactions on Systems, Man, and Cybernetics: Systems 46.1 (2015): pp. 61-75. (Year: 2015).*

McPeak, Scott, Charles-Henri Gros, and Murali Krishna Ramanathan. "Scalable and incremental software bug detection." Proceedings of the 2013 9th Joint Meeting on Foundations of Software Engineering. 2013.pp. 554-564. (Year: 2013).*

Björn Lisper et al., "Static Backward Demand-Driven Slicing," Proceedings of the 2015 Workshop on Partial Evaluation and Program Manipulation, Jan. 2015, pp. 115-126, ACM, https://dl.acm.org/doi/pdf/10.1145/2678015.2682538.

* cited by examiner

```
1   unsigned int a,b,c,y,z;
2   int arr[50];
3   . . .
4   z = *;
5   if(*) a = 50;
6   b = a >>10;
7   c = 10;
8   if (c == z){
9       a = *;
10      if( a < c ) {
11          y = a++;
12          assert( y < 50);
13          arr[y] = b;
14      }
15  }
16  . . . .
```

FIG. 1A

```
1   unsigned int a,b,c,y,z;
2   int arr[50];
3   . . .
4   z = *;
5   if(*) a = 49;   //c1
6   b = a >>10;
7   c = 100;   //c2
8   if (c == z){
9       a = *;
10      if( a < c ) {
11          y = a++;
12          assert( y < 50);
13          arr[y] = b;
14      }
15  }
16  . . . .
```

FIG. 1B

METHOD AND SYSTEM FOR IDENTIFYING RELEVANT CHANGES FOR INCREMENTAL VERIFICATION OF EVOLVING SOFTWARE

PRIORITY CLAIM

This U.S. patent application claims priority under 35 U.S.C. § 119 to: Indian Patent Application No. 202221012260, filed on 7 Mar. 2022. The entire contents of the aforementioned application are incorporated herein by reference.

TECHNICAL FIELD

The disclosure herein generally relates to the field of software analysis, and, more particularly, to a method and system for identifying relevant changes for incremental verification of an evolving software.

BACKGROUND

Software evolves continuously with changes made to existing code. Changes can introduce new defects in existing well tested software systems. Hence, ensuring safety of software at each release with respect to program properties is essential. Verifying the entire system for each change is tedious, time consuming and not practical. Therefore, software verification is an intrinsically incremental verification of program properties, especially for evolving software.

The objective of incremental verification of program properties is to speed-up the analysis. Typically, every change in the code and its dependencies are analyzed during incremental verification. The time required for incremental verification is directly proportional to the amount of code being analyzed. An interesting observation is that not every change in the program impacts verification outcome of program properties. If changes relevant to property being verified can be identified using a light-weight pre-analysis, then the time spent in analyzing irrelevant changes can be saved thereby reducing the overall cost of incremental analysis. Any existing incremental analysis/verification techniques can benefit from such a pre-analysis and can become much more efficient.

Modern software verification tools are moving towards incremental verification of program properties to ensure safety of evolving software. These tools analyze each and every change in the code. However, not every change in the program impacts verification outcome of program properties. Moreover, analyzing these irrelevant changes adds to cost of incremental verification.

SUMMARY

Embodiments of the present disclosure present technological improvements as solutions to one or more of the above-mentioned technical problems recognized by the inventors in conventional systems. For example, in one embodiment, a system for identifying relevant changes for incremental verification of an evolving software is provided. The system comprises a user interface, one or more hardware processors and a memory. The user interface receives a first program and a second program of the evolving software, wherein the second program is a newer version of the evolving software as compared to the first program, wherein the first program and the second program comprises a plurality of property checking statements corresponding to a plurality of properties. The memory is in communication with the one or more hardware processors, wherein the one or more first hardware processors are configured to execute programmed instructions stored in the one or more first memories, to: identify a first set of variables used in the plurality of property checking statements from the second program, wherein the first set of variables are configured to check the plurality of properties; compute a set of value influencing variables (VIVs) at each statement that are influencing values of the first set of variables in the second program, wherein the set of VIVs are computed from: (i) a set of assignment statements that assign or define values of a value influencing strongly live variable in the second program, and (ii) a set of conditional statements that are reaching via a control flow to the plurality of property checking statement in the second program; identify one or more changed statements in the second program by comparing the first program and the second program using a text differencing tool; and identify relevant changes using the computed set of VIVs and the identified one or more changed statements, wherein relevant changes are identified based on: change in assignment statement, wherein if modified variables collected from a changed assignment statement are present in the set of VIVs at the changed assignment statement, then the changed assignment statement is marked as relevant, and change in conditional statement, wherein if variables used in a changed condition are present in the set of VIVs at the changed conditional statement, then the changed conditional statement is marked as relevant.

In another aspect, a method for identifying relevant changes for incremental verification of an evolving software is provided. Initially, via a user interface, a first program and a second program of the evolving software are received, wherein the second program is a newer version of the evolving software as compared to the first program, wherein the first program and the second program comprises a plurality of property checking statements corresponding to a plurality of properties. Further, a first set of variables used in the plurality of property checking statements is identified from the second program, wherein the first set of variables are configured to check the plurality of properties. In the next step, a set of value influencing variables (VIVs) is computed at each statement that are influencing values of the first set of variables in the second program, wherein the set of VIVs are computed from: (i) a set of assignment statements that assign or define values of a value influencing strongly live variable in the second program, and (ii) a set of conditional statements that are reaching via a control flow to the plurality of property checking statement in the second program. Further, one or more changed statements are identified in the second program by comparing the first program and the second program using a text differencing tool. And finally, relevant changes are identified using the computed set of VIVs and the identified one or more changed statements, wherein relevant changes are identified based on: change in assignment statement, wherein if modified variables collected from a changed assignment statement are present in the set of VIVs at the changed assignment statement, then the changed assignment statement is marked as relevant, and change in conditional statement, wherein if variables used in a changed condition are present in the set of VIVs at the changed conditional statement, then the changed conditional statement is marked as relevant.

In yet another aspect, one or more non-transitory machine-readable information storage mediums comprising one or more instructions which when executed by one or more hardware processors cause identifying relevant changes for incremental verification of an evolving software. Initially, via a user interface, a first program and a second program of the evolving software are received, wherein the second program is a newer version of the evolving software as compared to the first program, wherein the first program and the second program comprises a plurality of property checking statements corresponding to a plurality of properties. Further, a first set of variables used in the plurality of property checking statements is identified from the second program, wherein the first set of variables are configured to check the plurality of properties. In the next step, a set of value influencing variables (VIVs) is computed at each statement that are influencing values of the first set of variables in the second program, wherein the set of VIVs are computed from: (i) a set of assignment statements that assign or define values of a value influencing strongly live variable in the second program, and (ii) a set of conditional statements that are reaching via a control flow to the plurality of property checking statement in the second program. Further, one or more changed statements are identified in the second program by comparing the first program and the second program using a text differencing tool. And finally, relevant changes are identified using the computed set of VIVs and the identified one or more changed statements, wherein relevant changes are identified based on: change in assignment statement, wherein if modified variables collected from a changed assignment statement are present in the set of VIVs at the changed assignment statement, then the changed assignment statement is marked as relevant, and change in conditional statement, wherein if variables used in a changed condition are present in the set of VIVs at the changed conditional statement, then the changed conditional statement is marked as relevant.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 1A and 1B (collectively referred as FIG. 1) shows an example of a first program and a second program respectively.

DETAILED DESCRIPTION

Figure 2:
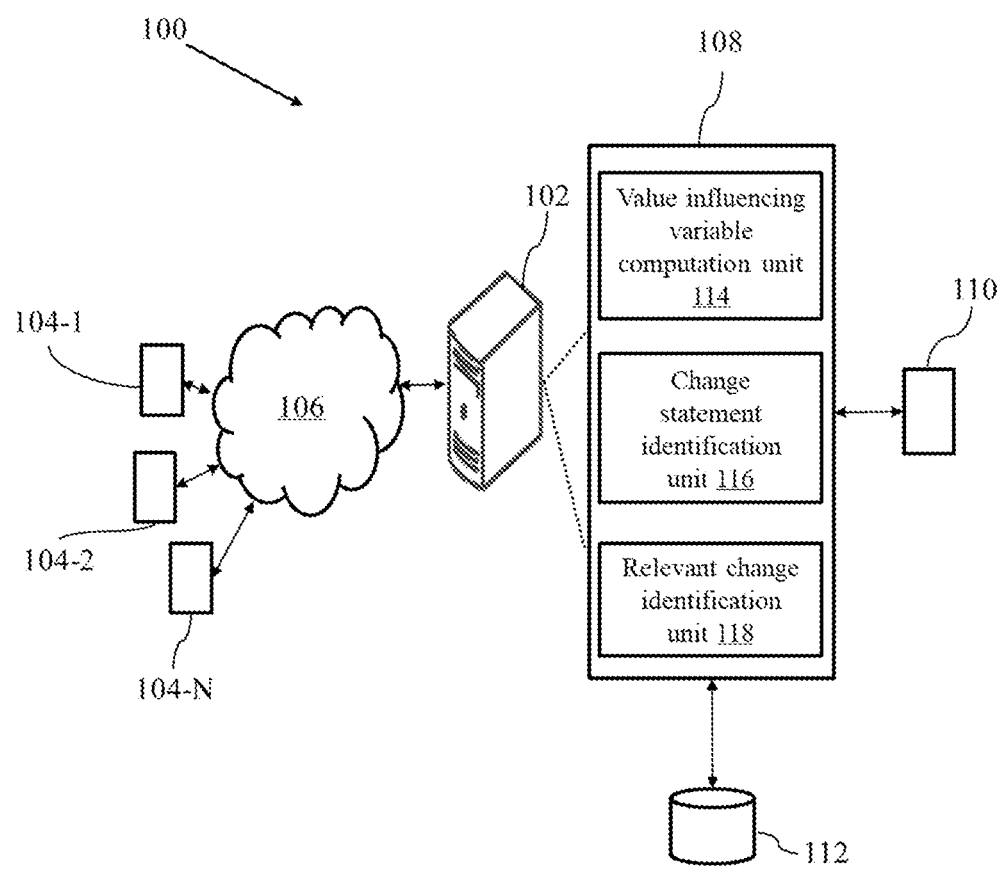
FIG. 2 illustrates a block diagram of a system for identifying relevant changes for incremental verification of an evolving software according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Modern software verification tools are moving towards incremental verification of program properties to ensure safety of evolving software systems. These tools analyze each and every change in the code. However, not every change in the program impacts verification outcome of program properties. Moreover, analyzing these irrelevant changes adds to cost of incremental verification.

To address this, a lightweight pre-analysis phase has been disclosed that identifies relevant changes with respect to program properties before applying any incremental verification technique. To identify relevant changes, the system provides a relevant change identification technique (RCIT). The RCIT uses a variant of the strongly live variables (SLV) analysis to compute variables that are influencing the verification outcome of program properties. RCIT, then utilize computed variables to identify relevant changes.

The concept of relevant changes identification can also be explained with the help of an example, consider an old and a new version of a program as shown in FIG. 1. FIG. 1A shows a first program and FIG. 1B shows a second program, wherein the second program is newer version of the first program. Both versions are intended to verify correctness with respect to property encoded as an assertion at line 12. The encoded property is to ensure index of array is within bounds. In the new program two changes c1 and c2 are introduced at line 5 and 7, respectively. The change c1 assigns a new value to variable a, which is referred (via variable b) in the statement at line 13. This usage of variable b does not influence the values of variables read or used in the property. Thus, verification outcome of the property is not impacted by the change c1, so it can be safely ignored. Now, consider the change c2, which modifies the value assigned to variable c from 10 to 100. This variable is respectively compared with variables z and a in the conditions at line 8 and 10. The comparison modifies the potential value-range of variable a in the true branch of the If condition (at line 10)—from $\{0, 9\}$ to $\{0, 99\}$, which can make the property (at line 12) as potentially unsafe. So, the impact of this change needs to be considered while verifying the new program.

Thus, in the above example, change c2 is relevant, which is impacting verification outcome of the encoded property and change c1 is irrelevant. Slicing with respect to encoded property is an obvious solution to identify such a relevant change. However, since the main aim of relevant changes identification is to make overall incremental analysis/verification faster, it is important that the relevant change detection be low cost and efficient. Standard way of program slicing using program dependence graph (PDG) is costly. Even static backward demand-driven slicing proposed in can be as costly as using a PDG.

The present disclosure provides a system and method for identifying relevant changes for incremental verification of an evolving software. The disclosure provides a light-weight pre-analysis phase of identifying relevant changes that can lead to improvement in efficiency of all existing incremental verification techniques.

The system provides a relevant change identification technique (RCIT) with respect to program properties. The RCIT uses a variant of standard Strongly Live Variable (SLV) analysis and computes variables at every program point that are influencing values of variables used in the given program properties. These variables are referred as value influencing variables (VIVs). The RCIT, then uses computed VIVs and changed/added statement information to identify relevant changes. In reference to the example shown in FIG. 1, the system and method is configured to identify change c2 as relevant with respect to encoded program property.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

According to an embodiment of the disclosure, FIG. 2 illustrates a block diagram of a system 100 for identifying relevant changes for incremental verification of an evolving software. The system 100 is configured to define value-influencing variables (VIVs) with respect to given program properties. A value-influencing SLV analysis is used to compute the VIVs. The system 100 is further configured to identify relevant change using computed VIVs. It may be understood that the system 100 comprises one or more computing devices 102, such as a laptop computer, a desktop computer, a notebook, a workstation, a cloud-based computing environment and the like. It will be understood that the system 100 may be accessed through one or more input/output interfaces 104-A, 104-B . . . , collectively referred to as I/O interface 104 or user interface 104. Examples of the I/O interface 104 may include, but are not limited to, a user interface, a portable computer, a personal digital assistant, a handheld device, a smartphone, a tablet computer, a workstation and the like. The I/O interface 104 are communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 may be implemented in a workstation, a mainframe computer, a server, and a network server. In an embodiment, the computing device 102 further comprises one or more hardware processors 108, one or more memory 110, hereinafter referred as a memory 110 and a data repository 112, for example, a repository 112. The memory 110 is in communication with the one or more hardware processors 108, wherein the one or more hardware processors 108 are configured to execute programmed instructions stored in the memory 110, to perform various functions as explained in the later part of the disclosure. The repository 112 may store data processed, received, and generated by the system 100. The memory 110 further comprises a plurality of units for performing various functions. The plurality of units comprises a value influencing variable (VIV) computation unit 114, a change statement identification unit 116 and a relevant change identification unit 118 as shown in the block diagram of FIG. 1.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

According to an embodiment of the disclosure, the system 100 is configured to receive, a first program and a second program of the evolving software. The second program is a newer version of the evolving software as compared to the first program. Normally, the first program and the second program comprise a plurality of property checking statements corresponding to a plurality of properties.

Figure 3:
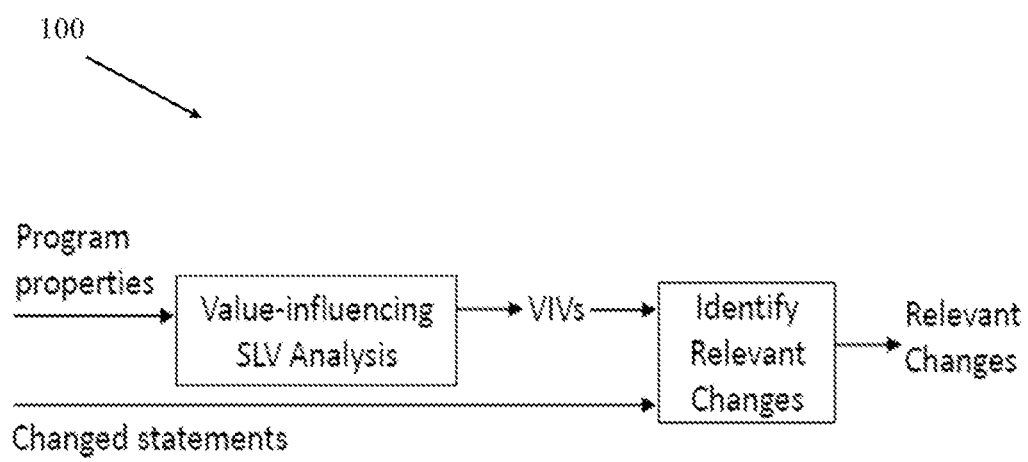
FIG. 3 is a block diagram showing relevant change identification technique (RCIT) of the system of FIG. 2 according to some embodiments of the present disclosure.

According to an embodiment of the disclosure, a block diagram of the relevant change identification technique (RCIT) is shown in FIG. 3. At first RCIT computes value influencing variables (VIVs) for program properties using SLV analysis. Then RCIT identifies relevant changes using computed VIVs and changed statements.

According to an embodiment of the disclosure, the VIV computation unit 114 is configured to compute a set of VIVs from the second program. The VIV is a variable that influences values of variables used in a statement that checks a program property. The VIVs are computed at each program point or at each statement of the second program. First, a first set of variables used in the plurality of property checking statements is identified from the second program. The first set of variables are configured to check the plurality of properties. The VIV computation unit 114 is then configured to the set of value influencing variables (VIVs) at each statement that are influencing values of the first set of variables in the second program. The set of VIVs are computed from: (i) a set of assignment statements that assign or define values of a value influencing strongly live variable in the second program, and (ii) a set of conditional statements that are reaching via a control flow to the plurality of property checking statement in the second program. The liveness of variables is calculated with respect to variables used in the property checking statement.

Figure 4:
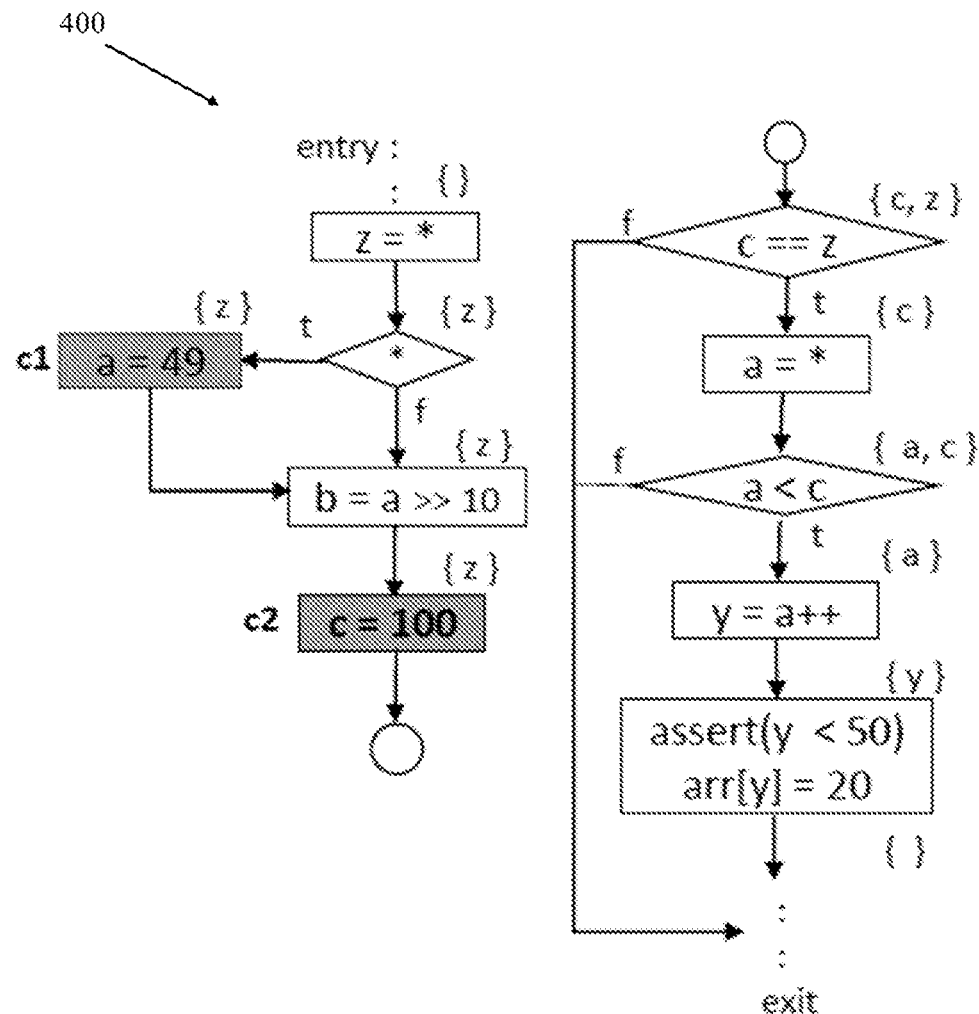
FIG. 4 is a control flow graph of the second program shown in the example of FIG. 1.

The explanation of the VIV computation unit 114 can further be explained with the help of the example program shown in FIG. 1. FIG. 4 shows control flow graph (CFG) 400 for the second program given in FIG. 1B with property checking statement (assert(y<50)) at line 12. The values in braces ({ }) at each statement shows VIVs with respect to variable y used at line 12. The set of VIVs are shown at the top of every node in the CFG, and same will be present at the bottom of its predecessor. At line 11, assignment to variable y (used variable in the property) using a makes variable a as VIV. At line 10, conditional expression of If statement is influencing value of a -{0, 99} in true branch and {100, MAX} in false branch of the condition using value of c, which is defined at line 7 and compared with variable z at line 8. Hence, variables used in those conditions becomes the set of VIVs.

According to an embodiment of the disclosure, the change statement identification unit 116 is configured to identify or more changed statements in the second program by comparing the first program and the second program using a text differencing tool. In an example, GNU diff checker was used as the text differencing tool. The text differencing tool ignores cosmetic changes such as addition/deletion of blank lines, white-spaces etc. that are inconsequential to the analysis of the program.

According to an embodiment of the disclosure, the relevant change identification unit 118 is configured to identify relevant changes using the computed set of VIVs and the identified one or more changed statements. The relevant changes are identified based on the change in assignment statement and the change in conditional statement.

In case of change in assignment, first modified variables are collected from the changed assignment statement. If any of the modified variables is present in the set of VIVs at the (bottom of) changed assignment statement, then that changed assignment statement is marked as relevant. In FIG. 4, changes in assignment c1 and c2 are highlighted. Change c1 is modifying variable a, and a is not present in the set of VIVs at c1, so c1 is marked as irrelevant. However, at change c2, the modified variable c is present in the set of VIVs, hence this change is marked as relevant with respect to given property.

In case of change in conditional statement, the change in condition modifies the value/value-range of a variable that it will hold along the true and false branch. All variables used in condition expression are considered as modified variables. If any of the modified variables is present in the set of VIVs at the changed conditional statement, then the changed conditional statement is marked as relevant.

According to an embodiment of the disclosure, the set of VIVs are computed using strong liveness. The set of VIVs is computed at each program statement using a variant of standard data flow analysis defined as Strongly Live Variable (SLV). First, the definition of SLV is stated and later, adaption of SLV is presented for computing the set of VIVs. The SLV analysis (bit-vector backward may, analysis) consider a variable as strongly live when it is used in a statement other than assignment statement, or it is used in an assignment statement defining a variable that is strongly live Following is the definition for SLV—

$$IN_n = f_n(OUT_n) \quad (1)$$

$$OUT_n = \begin{cases} BI & n \text{ is End block} \\ \bigcup_{s \in succ(n)} IN_s & \text{otherwise} \end{cases} \text{ where,} \quad (2)$$

$$\begin{cases} (X - \{y\}) \cup (Opd(e)) & n \text{ is } y = e, e \in Expr, y \in X \\ X - \{y\} & n \text{ is input } (y) \\ X \cup \{y\} & n \text{ is use } (y) \\ X & \text{otherwise} \end{cases} \quad (3)$$

Here, $IN_n$, $OUT_n$ are sets of variables. BI is boundary information—represented as $\emptyset$ for program End. $Opd(e)$ denotes the set of program variables used in an expression e. input(y) denotes a statement where y is an input variable and use(y) denotes a statement other than assignment statement in which y is being used.

To compute the set of VIVs with respect to given program properties, the value-influencing SLV is introduced, which is defined as follows: A variable v is value-influencing SLV when it is used in a statement which represents program property (e.g., assertion, division expression for zero division property etc.), or it is used in an assignment statement defining a variable that is value-influencing SLV, or it is used in a conditional statement that is reaching to property checking statement in the control flow graph (CFG) of the second program.

Then the modified transfer flow function $f_n(X)$ for value influencing SLV is presented in Equation (4). propuse (y) denotes a property checking statement in which y is being used.

$$\begin{cases} (X - \{y\}) \cup (Opd(e)) & n \text{ is } y = e, e \in Expr, y \in X \\ X - \{y\} & n \text{ is input}(y) \\ X \cup \{y\} & n \text{ is propuse}(y) \\ X \cup \{Opd(c)\} & n \text{ is conditional statement reaching to} \\ & \text{program property in the } CFG, \\ & c \text{ is a condition, } c \in Expr \\ X & \text{otherwise} \end{cases} \quad (4)$$

The data flow analysis for computing value-influencing SLVs is performed by applying transfer flow function defined in equation 4 at every statement. The set of VIVs shown at different program points in FIG. 4 are nothing but computed value influencing SLVs. These value-influencing SLVs are computed inter-procedurally using function-summary based data flow analysis.

Figure 5:
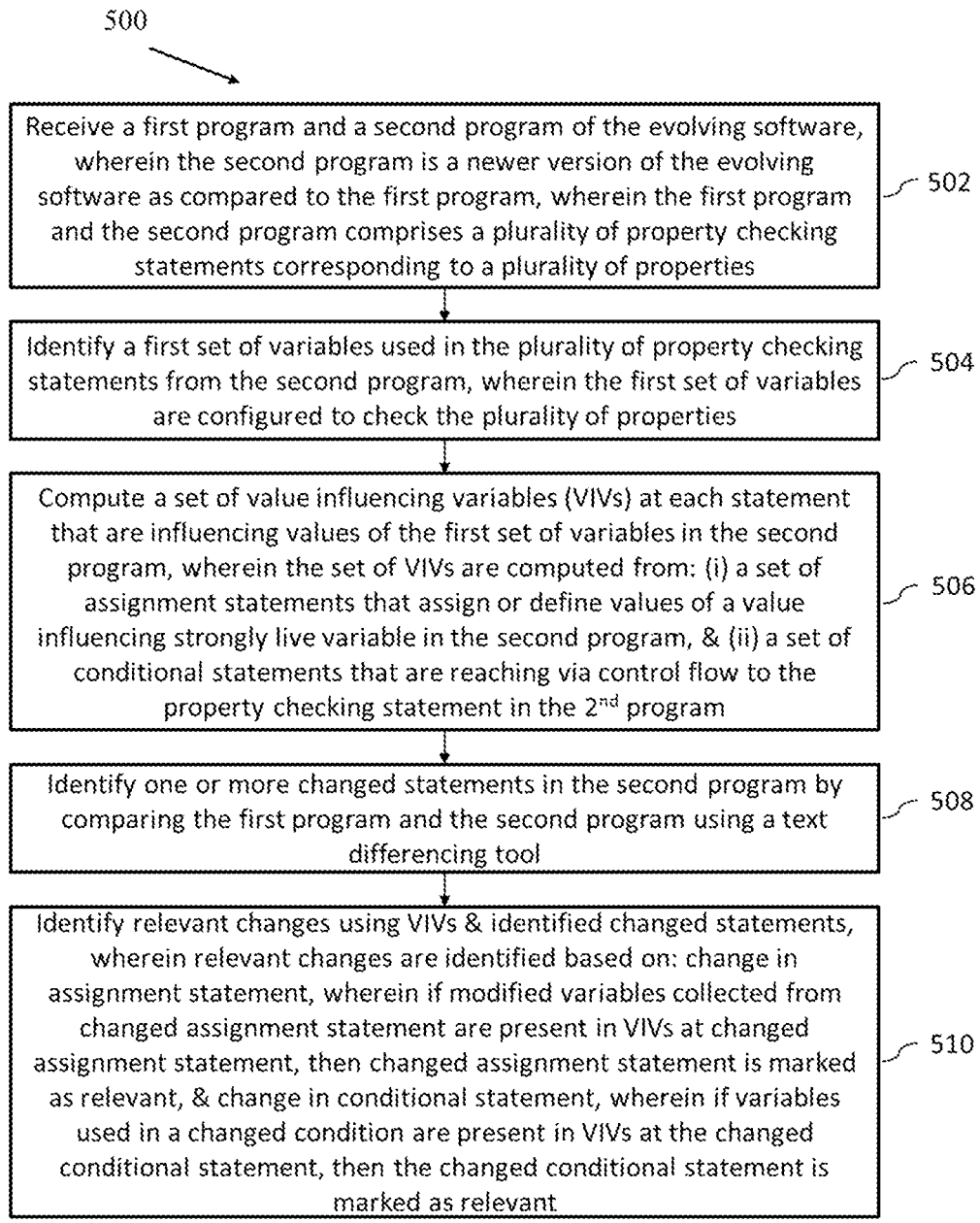
FIG. 5 is a flowchart of a method for identifying relevant changes for incremental verification of an evolving software according to some embodiments of the present disclosure

FIG. 5 illustrates a flow chart of a method 500 for identifying relevant changes for incremental verification of an evolving software, in accordance with an example embodiment of the present disclosure. The method 500 depicted in the flow chart may be executed by a system, for example, the system 100 of FIG. 1. In an example embodiment, the system 100 may be embodied in the computing device.

Operations of the flowchart, and combinations of operations in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 500 are described with help of system 100. However, the operations of the method 500 can be described and/or practiced by using any other system.

Initially at step 502 of the method 500, the first program and the second program of the evolving software is received. The second program is the newer version of the evolving software as compared to the first program. The first program and the second program comprise the plurality of property checking statements corresponding to a plurality of properties. In the next step 504, the first set of variables used in the plurality of property checking statements is identified from the second program. The first set of variables are configured to check the plurality of properties.

Further at step 506 of the method 500, the set of value influencing variables (VIVs) is computed at each statement that are influencing values of the first set of variables in the second program. The set of VIVs are computed from: (i) the set of assignment statements that assign or define values of the value influencing strongly live variable in the second program, and (ii) the set of conditional statements that are reaching via the control flow to the plurality of property checking statement in the second program. In the next step 508, one or more changed statements are identified in the second program by comparing the first program and the second program using the text differencing tool.

Finally at step 510 of the method 500, relevant changes are identified using the computed set of VIVs and the identified one or more changed statements, wherein relevant changes are identified based on following two things: Firstly, change in assignment statement, wherein if modified variables collected from the changed assignment statement are present in the set of VIVs at the changed assignment statement, then the changed assignment statement is marked as relevant. And secondly, change in conditional statement, wherein if variables used in the changed condition are present in the set of VIVs at the changed conditional statement, then the changed conditional statement is marked as relevant.

According to an embodiment of the disclosure, effectiveness of RCIT can also be evaluated by empirically substantiating the following three claims using experimental results.

Claim 1: RCIT effectively identifies relevant changes with respect to program properties in real-life code changes,
Claim 2: RCIT performs light-weight, quick analysis of changes, hence applicable as pre-analysis phase for incremental verification techniques, and
Claim 3: Detecting relevant changes using RCIT is far more efficient than using PDG-based slicing.

To substantiate these claims experiment conducted on changes made in a total five consecutive versions of two open source C applications—gzip (version 1.5-1.9) and spell (version 1.0-1.1).

Experimental Setup

Marking changed nodes: To create mapping of the code between two subsequent versions, first textual difference is generated between preprocessed files of old and new versions using GNU DiffUtils. The version differencing is smart and ignores cosmetic changes such as addition/deletion of blank lines, white-spaces etc. that are inconsequential to the analysis of the program. The diff output is processed, and source code line number map is created between two versions of the code. Further, this line map is used to create Abstract Syntax Tree (AST) and Symbol Table (ST) nodes map between those two versions. Nodes present on changed/added lines are marked as changed or added nodes.

Value influencing SLV Computation: Value influencing SLV analysis is implemented as described earlier. Consecutive versions of open source applications were evaluated with respect to two types of program properties, array index out of bound (AIOB) and zero division (ZD). This means propuse (y) in equation (4) refers to use of variables in index expression of array and division expression of statements.

Relevant change identification using PDG based slicing: To show the effectiveness of RCIT, relevant changes were computed using PDG based slicing and compared it with RCIT. Sliced program statements with respect to all program properties are computed and if a changed statement is part of sliced statements then that change is marked as relevant. All experiments were conducted on a machine running Windows 10 OS with 2.11 GHz Intel processor and 16 GB of RAM.

Experimental Results

Table I presents the results of the experiment. Inspecting the table, the three claims made earlier in this section can be justified.

Claim 1: A total 319 real-life semantic changes are evaluated across 5 versions of open source applications with respect to 6905 (AIOB and ZD) properties. RCIT found only 131 changes are relevant. Approx. 59% changes are found to be irrelevant with respect to given properties, showing the effectiveness of RCIT. This will surely reduce time and analysis cost of incremental verification of program properties. Moreover, as there are multiple changes in a function, the 319 actual changes contributed to 41 edited function which reduced to 23 when only relevant changes are considered. This can reduce the cost of incremental analyzers, which considers function as a work unit for incremental analysis/verification. Also, it can be noted that, in the gzip application from version 1.7 to 1.8, no change is relevant with respect to AIOB and ZD properties, so the new version's incremental analysis/verification can be completely skipped for verification of these properties.

Most of the changes in analyzed versions are in assignments or conditional statements; however, there are few instances where parameters of a function call have changed. A conservative approach is taken, and a changed call statement is marked as a relevant change Claim 2: The timing column under RCIT in Table I shows end-to-end time of RCIT analysis. It can be seen that for approx. 47KLOC and 6.9K properties, relevant changes are identified in approx. 23 seconds. Also, it is noteworthy to see that for the application of size 11 KLOC, it took only 5-5.5 seconds for analysis. This shows that proposed analysis is very quick and light-weight, hence very useful to apply as a pre-analysis to existing incremental verification techniques.

Claim 3: The PDG based slicing column of Table I shows relevant changes identified by slicing approach and time taken by the approach. RCIT conservatively considers all reachable conditions to program properties whereas slicing approach considers conditional statements visited via control dependence of program properties. Hence, slicing approach is more precise and identifies around 10% more changes as irrelevant which RCIT could not detect. However, this 10% extra irrelevant changes identification comes at the cost of much more efficiency loss. On an average, slicing took 125 seconds whereas RCIT took only 23 seconds. So, keeping in mind objective of identifying relevant changes, obviously using program slices would not be a good choice as a pre-analysis phase for any incremental verification technique.

include software means. Alternatively, the embodiments may be implemented on different hardware devices, e.g. using a plurality of CPUs.

The embodiments herein can comprise hardware and software elements. The embodiments that are implemented in software include but are not limited to, firmware, resident

TABLE 1

Experimental results showing the relevant changes in each new version

| App. | Old Version (V1) | New Version (V2) | V2 KLOC | V2 #Properties | Actual Changes | | Relevant Changes Identification using | | | | |
|------|---|---|---|---|---|---|---|---|---|---|---|
| | | | | | | | RCIT | | | PDG based slicing | |
| | | | | | #Changes | #Edited Functions | #Relevant Changes | #Edited Functions | Time (second) | #Relevant Changes | Time (second) |
| gzip | 1.5 | 1.6 | 11.2 | 1717 | 36 | 5 | 16 | 3 | 5.2 | 13 | 26.6 |
| | 1.6 | 1.7 | 11.5 | 1720 | 135 | 18 | 66 | 14 | 5.5 | 45 | 29.9 |
| | 1.7 | 1.8 | 11.5 | 1714 | 12 | 2 | 0 | 0 | 5.2 | 0 | 28.6 |
| | 1.8 | 1.9 | 11.4 | 1716 | 25 | 8 | 7 | 2 | 5.4 | 6 | 32.1 |
| spell | 1.0 | 1.1 | 2.1 | 38 | 111 | 8 | 42 | 4 | 2 | 31 | 8 |
| | Total | | 47.7 | 6905 | 319 | 41 | 131 | 23 | 23.3 | 95 | 125.2 |

Overall, it can be seen that proposed approach, RCIT shows its broader applicability as a pre-analysis phase for any incremental analysis/verification technique by virtue of its light-weight and effective identification of relevant changes The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem related to efficient, timely and cost effective identification of incremental verification of program properties to ensure safety of evolving software. The embodiment thus provides a method and a system for identifying relevant changes for incremental verification of an evolving software.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory.

Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for identifying relevant changes for incremental verification of an evolving software, the method comprising:
    receiving, via a user interface, a first program and a second program of the evolving software, wherein the second program is a newer version of the evolving software as compared to the first program, wherein the first program and the second program comprises a plurality of property checking statements corresponding to a plurality of properties;
    identifying, via one or more hardware processors, a first set of variables used in the plurality of property checking statements from the second program, wherein the first set of variables checks the plurality of properties;
    computing, via the one or more hardware processors, a set of value influencing variables (VIVs) at each statement that are influencing values of the first set of variables in the second program, wherein the set of VIVs are computed from:
        (i) a set of assignment statements that assign or define values of a value influencing strongly live variable in the second program, and
        (ii) a set of conditional statements that are reaching via a control flow to the plurality of property checking statement in the second program;
    identifying, via the one or more hardware processors, one or more changed statements in the second program by comparing the first program and the second program using a text differencing tool; and
    identifying, via the one or more hardware processors, relevant changes using the computed set of VIVs and the identified one or more changed statements, wherein relevant changes are identified based on:
        change in assignment statement, wherein if modified variables collected from a changed assignment statement are present in the set of VIVs at the changed assignment statement, then the changed assignment statement is marked as relevant, and
        change in conditional statement, wherein if variables used in a changed condition are present in the set of VIVs at the changed conditional statement, then the changed conditional statement is marked as relevant.

2. The processor implemented method of claim 1, wherein the value-influencing strong liveness of a variable is calculated with respect to variables used in the plurality of property checking statement.

3. The processor implemented method of claim 1, further comprising computing VIVs at each program statement using a value-influencing strongly live variable (SLV) analysis.

4. The method of claim 3, further comprising introducing a value-influencing SLV, wherein a variable is value-influencing SLV when the variable is used i) in a statement which represents program property, or ii) the variable is used in an assignment statement defining variable that is value-influencing SLV, or iii) the variable is used in a conditional statement that is reaching to property checking statement in the control flow graph (CFG) of the second program.

5. A system for identifying relevant changes for incremental verification of an evolving software, the system comprises:
    a user interface for receiving a first program and a second program of the evolving software, wherein the second program is a newer version of the evolving software as compared to the first program, wherein the first program and the second program comprises a plurality of property checking statements corresponding to a plurality of properties;
    one or more hardware processors; and
    a memory in communication with the one or more hardware processors, wherein the one or more first hardware processors are configured to execute programmed instructions stored in the one or more first memories, to:
        identify a first set of variables used in the plurality of property checking statements from the second program, wherein the first set of variables checks the plurality of properties;
        compute a set of value influencing variables (VIVs) at each statement that are influencing values of the first set of variables in the second program, wherein the set of VIVs are computed from:
            (i) a set of assignment statements that assign or define values of a value influencing strongly live variable in the second program, and
            (ii) a set of conditional statements that are reaching via a control flow to the plurality of property checking statement in the second program;
        identify one or more changed statements in the second program by comparing the first program and the second program using a text differencing tool; and
        identify relevant changes using the computed set of VIVs and the identified one or more changed statements, wherein relevant changes are identified based on:
            change in assignment statement, wherein if modified variables collected from a changed assignment statement are present in the set of VIVs at the changed assignment statement, then the changed assignment statement is marked as relevant, and
            change in conditional statement, wherein if variables used in a changed condition are present in the set of VIVs at the changed conditional statement, then the changed conditional statement is marked as relevant.

6. The system of claim 5, wherein the value-influencing strong liveness of a variable is calculated with respect to variables used in the plurality of property checking statement.

7. The system of claim 5, further configured to compute the set of VIVs at each program statement using a value-influencing strongly live variable (SLV) analysis.

8. The system of claim 7, further configured to introduce a value-influencing SLV, wherein a variable is value-influencing SLV when the variable is used i) in a statement which represents program property, or ii) the variable is used in an assignment statement defining variable that is value-influencing SLV, or iii) the variable is used in a conditional statement that is reaching to property checking statement in the control flow graph (CFG) of the second program.

9. One or more non-transitory machine-readable information storage mediums comprising one or more instructions which when executed by one or more hardware processors cause:
- receiving, via a user interface, a first program and a second program of the evolving software, wherein the second program is a newer version of the evolving software as compared to the first program, wherein the first program and the second program comprises a plurality of property checking statements corresponding to a plurality of properties;
- identifying, a first set of variables used in the plurality of property checking statements from the second program, wherein the first set of variables checks the plurality of properties;
- computing, via the one or more hardware processors, a set of value influencing variables (VIVs) at each statement that are influencing values of the first set of variables in the second program, wherein the set of VIVs are computed from:
  - (i) a set of assignment statements that assign or define values of a value influencing strongly live variable in the second program, and
  - (ii) a set of conditional statements that are reaching via a control flow to the plurality of property checking statement in the second program;
- identifying, via the one or more hardware processors, one or more changed statements in the second program by comparing the first program and the second program using a text differencing tool; and
- identifying, via the one or more hardware processors, relevant changes using the computed set of VIVs and the identified one or more changed statements, wherein relevant changes are identified based on:
  - change in assignment statement, wherein if modified variables collected from a changed assignment statement are present in the set of VIVs at the changed assignment statement, then the changed assignment statement is marked as relevant, and
  - change in conditional statement, wherein if variables used in a changed condition are present in the set of VIVs at the changed conditional statement, then the changed conditional statement is marked as relevant.

* * * * *